(12) United States Patent
Brinkhuis et al.

(10) Patent No.: US 7,851,530 B2
(45) Date of Patent: Dec. 14, 2010

(54) CARBON-SUBSTITUTED METHYL AMINE DERIVATIVES AND THEIR USE AS A RHEOLOGY CONTROL AGENTS

(75) Inventors: Richard Hendrikus Gerrit Brinkhuis, Zwolle (NL); Rudolp Anthonius Maria VenderBosch, Duiven (NL)

(73) Assignee: Nuplex Resins B.V., Bergen op Zoom (NL)

( * ) Notice: Subject to any disclaimer, the term of this patent is extended or adjusted under 35 U.S.C. 154(b) by 992 days.

(21) Appl. No.: 10/564,046

(22) PCT Filed: Jul. 8, 2004

(86) PCT No.: PCT/EP2004/007597

§ 371 (c)(1),
(2), (4) Date: May 10, 2006

(87) PCT Pub. No.: WO2005/005557

PCT Pub. Date: Jan. 20, 2005

(65) Prior Publication Data

US 2006/0289828 A1 Dec. 28, 2006

Related U.S. Application Data

(60) Provisional application No. 60/530,240, filed on Dec. 18, 2003.

(30) Foreign Application Priority Data

Jul. 8, 2003 (EP) .................................. 03077152

(51) Int. Cl.
 *B01F 17/00* (2006.01)
(52) U.S. Cl. ....................... 524/212; 524/210; 524/211; 524/213; 524/186
(58) Field of Classification Search ............ 252/183.11; 528/59, 44; 524/186, 210, 211, 212, 213, 524/218, 220, 227
See application file for complete search history.

(56) References Cited

U.S. PATENT DOCUMENTS

| | | | | |
|---|---|---|---|---|
| 4,311,622 A | * | 1/1982 | Buter | .......................... 524/542 |
| 4,965,317 A | * | 10/1990 | Kania et al. | .................. 525/155 |
| 5,039,801 A | | 8/1991 | Brossi et al. | |
| 6,815,501 B2 | * | 11/2004 | Flosbach et al. | ............. 525/123 |
| 2005/0119422 A1 | * | 6/2005 | Baumgart et al. | ............ 525/540 |

FOREIGN PATENT DOCUMENTS

| | | |
|---|---|---|
| DE | 19924170 | 11/2000 |
| DE | 10126647 | 12/2002 |
| DE | 10139262 | 1/2003 |
| EP | 0192304 | 8/1986 |
| JP | 2000226442 A * | 8/2000 |

OTHER PUBLICATIONS

Machine translation of JP 2000226442.*
International Search Report and The Written Opinion of the International Searching Authority, Mailed Nov. 3, 2004, for International Application No. PCT/EP2004/007597 (9 Pages Total).

* cited by examiner

*Primary Examiner*—Harold Y Pyon
*Assistant Examiner*—Haidung D Nguyen
(74) *Attorney, Agent, or Firm*—Coraline J. Haitjema; David P. Owen; Howrey LLP

(57) ABSTRACT

The invention relates to the use as sagging controlling agent (SCA) in coating compositions of rheology control agents obtainable by reacting one or more polyisocyanates with one or more optically active amines or by reacting one or more polyamines with one or more optically active isocyanates. The invention also relates to rheology control agents obtainable as described above using specific polyisocyanates or polyamines. In addition the invention relates to the use of these rheology control agents in various applications.

17 Claims, 8 Drawing Sheets alpha Me BA (-): S-enantiomer of alpha Me BA (α-methylbenzylamine)
alpha Me BA (d,l): racemic mixture of alpha Me BA (α-methylbenzylamine)

CARBON-SUBSTITUTED METHYL AMINE DERIVATIVES AND THEIR USE AS A RHEOLOGY CONTROL AGENTS

This application is a §371 U.S. national phase application of International Application Number PCT/EP2004/007597, filed Jul. 8, 2004, and claims priority to European Application No. 03077152.1, filed Jul. 8, 2003 and U.S. Provisional Application No. 60/530,240, filed Dec. 18, 2003, the entire contents of which are incorporated by reference herein.

The invention relates to the use as sagging controlling agent (SCA) in coating compositions of rheology control agents obtainable by reacting one or more polyisocyanates with one or more optically active (mono)amines or by reacting one or more polyamines with one or more optically active (mono)isocyanates. The invention also relates to specific rheology control agents so obtainable. In addition the invention relates to the use of these specific rheology control agents in various applications.

The use of SCAs in coating compositions is well-known. For example, U.S. Pat. No. 4,311,622 discloses thixotropic coating compositions prepared from a binder and a sag control agent which is the reaction product of a diisocyanate and a monoamine or hydroxy monoamine. Similarly, EP-A-0 261 863 discloses fluidity controlling agents for paints which give thixotropic properties to a coating film when it is applied to the paint and hardly produces sagging in the formation of thick coating films.

However, the performance of conventional rheology control agents is not always sufficient and fairly high amounts may be necessary to get the desired rheological properties, particularly high viscosity at low shear. Accordingly, there is a need for rheology control agents with an improved performance so that the amount to be used can be reduced, the viscosity, particular at low shear, can be increased, the rate of viscosity build up can be improved, and/or its response to shear stress or level of dilution, to give good sag control and good levelling under application conditions. Furthermore, there is a need for sag control agents that give colour-free and completely clear and transparent clear coats in various types of coatings formulations, especially for preferred polyol-isocyanate curing systems and radiation curing coatings based on acryloyol functional resins, and other non-formaldehyde-based coating systems. It is also needed that these sag control agents are useful in preferred coating compositions that cure at temperatures below 100° C.

Surprisingly, we found that a specific class of urea compounds is able to deliver the rheological and optical performance that is needed.

The invention relates to the use as a SCA in coating compositions of a rheology control agent obtainable by reacting one or more polyisocyanates with one or more monoamines or by reacting one or more polyamines with one or more monoisocyanates to form a poly-urea compound, wherein at least one of the mono- or polyamine or mono- or polyisocyanate is optically active, not as racemic mixture, having a chiral carbon atom adjacent to an amine or isocyanate group, with the proviso that the amine is not an optically active amino acid and not an optically active amino acid ester or its isocyanate derivative.

According to a preferred first embodiment of the invention, the present invention relates to the use as a SCA in coating compositions of a rheology control agent obtainable by reacting one or more polyisocyanates with one or more optically active, carbon-substituted, methyl amines of the formula (I)

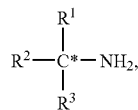

not as racemic mixture, wherein each of $R^1$, $R^2$, and $R^3$ are independently selected from hydrogen, linear or branched, substituted or unsubstituted, saturated or unsaturated hydrocarbyl or hetero atom containing group, including substituted or unsubstituted phenyl or naphthyl, whereby each of $R^1$, $R^2$, and $R^3$ is different such that the carbon atom is a chiral centre, with the proviso that the amine is not an optically active amino acid and not an optically active amino acid ester.

A second embodiment of the invention relates to the use as a SCA in a coating composition of a rheology control agent obtainable by reacting one or more polyamines with one or more optically active monoisocyanates of the formula (II)

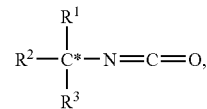

not as racemic mixture, wherein each of $R^1$, $R^2$, and $R^3$ are independently selected from hydrogen, linear or branched, substituted or unsubstituted, saturated or unsaturated hydrocarbyl or a hetero atom containing group, including substituted or unsubstituted phenyl or naphthyl, whereby each of $R^1$, $R^2$, and $R^3$ is different such that the carbon atom is a chiral centre, with the proviso that the resulting rheology modification agent is not based on the monoisocyanate derived from the amino group of an amino acid or amino acid ester.

Particularly preferred SCAs according to the first or second embodiment of the invention are obtained if one or more optically active amines are reacted with one or more polyisocyanates selected from the group consisting of substituted or unsubstituted linear aliphatic polyisocyanates with an even number of carbon atoms in the chain between two isocyanate groups (as well as their dimeric derivatives as uretdiones, and corresponding trimeric isocyanurates or biurets), substituted or unsubstituted aryl, aralkyl, and cyclohexylene polyisocyanates (as in the first embodiment), and if one or more optically active isocyanates are reacted with one or more polyamines selected from the group consisting of substituted or unsubstituted linear aliphatic polyamines with an even number of carbon atoms in the chain between two amino groups and substituted or unsubstituted aryl, aralkyl, and cyclohexylene polyamines (as in the second embodiment).

Accordingly, in a third embodiment the present invention further relates to polyurea derivatives obtainable by:

reacting one or more polyisocyanates selected from the group consisting of substituted or unsubstituted linear aliphatic polyisocyanates with an even number of carbon atoms in the chain between two isocyanate groups or their dimer or trimer derivatives (urethdione, isocyanurate and biuret analogues), and substituted or unsubstituted arylene, aralkylene, and cyclohexylene polyisocyanates, with one or more optically active, carbon-substituted, methyl amines of the formula (I)

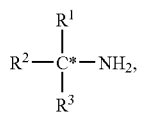

not as a racemic mixture, wherein each of $R^1$, $R^2$, and $R^3$ are independently selected from hydrogen, linear or branched, substituted or unsubstituted, saturated or unsaturated hydrocarbyl or hetero atom containing group, including substituted or unsubstituted phenyl or naphthyl, whereby each of $R^1$, $R^2$, and $R^3$ is different such that the carbon atom is a chiral centre, with the proviso that the amine is not an optically active amino acid and not an optically active amino acid ester and with the further proviso that the resulting rheology modification agent is not a compound of the formula (III),

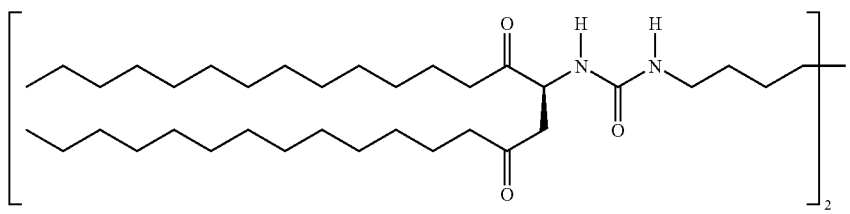

which is described by L. A. Estroff and A. D. Hamilton in *Angew. Chem. Int. Ed.* 2000, Vol. 39, No. 19, pp. 3447-3450 and to polyurea derivatives obtainable by:

reacting one or more polyamines selected from the group consisting of substituted or unsubstituted linear aliphatic polyamines with an even number of carbon atoms in the chain between two amino groups and substituted or unsubstituted arylene, aralkylene, and cyclohexylene polyamines, with one or more optically active monoisocyanates of the formula (II)

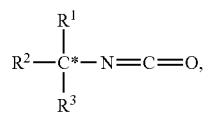

not as racemic mixture, wherein each of $R^1$, $R^2$, and $R^3$ are independently selected from hydrogen, linear or branched, substituted or unsubstituted hydrocarbyl, including substituted or unsubstituted phenyl or naphthyl, whereby each of $R^1$, $R^2$, and $R^3$ is different such that the carbon atom is a chiral centre, with the proviso that the resulting rheology modification agent is not based on a monoisocyanate derived from the amino group of an optically active amino acid or optically active amino acid ester, and with the further proviso that the resulting polyurea derivative is not a compound of the formula (III).

Furthermore, it was found that the polyurea derivatives of the third embodiment in general are suitable for use as rheology control agent in various applications, as will described in more detail below. Accordingly, in a fourth embodiment this invention relates to the use of polyurea derivatives of the third embodiment as rheology control agent.

A fifth embodiment relates to the use of a reaction product of an optically active polyamine that is reacted with an isocyanate, as a SCA in a coatings application.

Optionally small amounts of one or more additional compounds, which may influence crystallization properties of the final product may be present during the reaction to prepare a rheology control agent for use as SCA in the first, second, or fifth embodiment or during the reaction to prepare a polyurea derivative of the third embodiment. Examples of such additional compounds are reactive amines and/or isocyanates (mono-or polyfunctional) that differ from the main amine and/or isocyanate compound in the SCA.

The use of the prefix "poly" for polyisocyanates and polyamines indicates that at least two of the mentioned functionalities are present in the respective "poly" compound. It is noted that when a polyurea product is prepared, i.e. the reaction product of amines with a polyisocyanate or the reaction product of isocyanates with a polyamine, it is preferred to prepare a diurea product or triurea product.

In a preferred embodiment of the invention wherein polyurea products are prepared, it is possible to prepare polyurea products with the general formulae X-[urea-chiral centre]$_n$, X being the linking group of the molecule and n being the number of [urea-chiral centre] moieties (n is 2 or more), or, [urea moiety]-[chiral centre]-[urea moiety] (for example as obtained by reaction of two monoisocyanates with an optically active diamine as in the fifth embodiment). It is preferred to prepare a diurea product of the general formula X-[urea-chiral centre]$_n$, preferably wherein n is 2-5, more preferably wherein n is 2 or 3, most preferably wherein n is 2.

It is also noted that although at least one optically active amine or isocyanate is used in any of the five embodiments, the final reaction product that is obtained is not necessarily optically active. The final product may be in the d-, l-, and/or meso-form.

It is also noted that hereinafter, the general term "rheology modification agent" is used to indicate any rheology control agent used as SCA according to the first or second, or fifth embodiment of this invention and to indicate any polyurea derivative according to the third embodiment of this invention.

In case of $R^1$, $R^2$, and/or $R^3$ is a hydrocarbyl as defined above for the first, second, and third embodiment, it is preferably independently selected from the group consisting of linear, cyclic or branched, substituted or unsubstituted, saturated or unsaturated, optionally hetero atom-containing, $C_1$-$C_{25}$ alkyl, aryl, aralkyl, and alkenyl, fulfilling the above-mentioned provisos.

In a preferred embodiment, one of $R^1$, $R^2$, and $R^3$ is hydrogen and the other two are independently selected from one of the above-indicated $C_1$-$C_{25}$ groups. Optionally, two of $R^1$, $R^2$, and $R^3$ can be taken together with the carbon atom to which they are attached and form a substituted or unsubstituted ring containing 4 to 8 carbon atoms. If present, the substituents on $R^1$, $R^2$, and/or $R^3$ are preferably selected from the group consisting of alkyl, alkoxy, hydroxy, (preferably non-primary) amine, phosphonic acid, phosphonic ester, keto, ketimine, urethane, allophanate, amide, and urea groups, most preferably the substituents are selected from alkyl or alkoxy groups. If one or more of $R^1$, $R^2$, and $R^3$ is a hetero atom-containing $C_1$-$C_{25}$ group, it is preferably in the form of an ether unit.

In one preferred embodiment the rheology modification agent according to the invention is obtained by reacting one or more polyisocyanates with one or more optically active substituted benzyl amines selected from compounds of the formulae

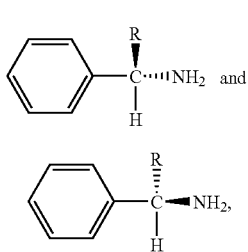

wherein R is a linear or branched, substituted or unsubstituted, saturated or unsaturated hydrocarbyl. If present, the substituents on R are preferably selected from the group consisting of hydroxy, amine, carboxylic acid, phosphonic acid, keto, ketimine, amine, ether, urethane, allophanate, urea, and isocyanurate groups. Preferably, R is selected from the group consisting of linear or branched, substituted or unsubstituted, saturated or unsaturated $C_1$-$C_{25}$ alkyl, aryl, aralkyl, and alkenyl. More preferably, R is a linear or branched $C_1$-$C_{25}$ alkyl. Even more preferably R is linear or branched $C_1$-$C_5$ alkyl. Most preferably R is a methyl or ethyl group.

In another preferred embodiment the rheology modification agent according to the invention is obtained by reacting one or more polyisocyanates with one or more optically active amines (either R or S enantiomer dominating) selected from the group consisting of compounds of the formulae:

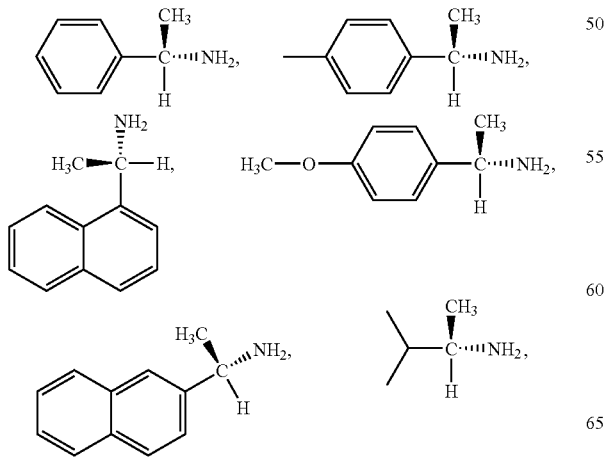

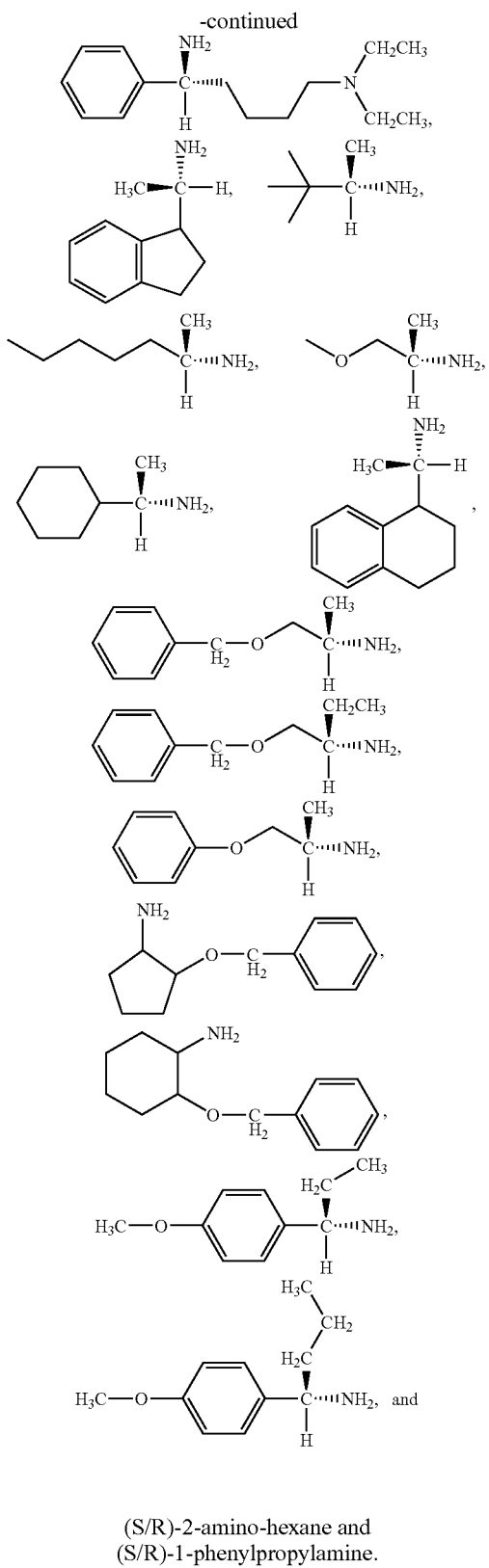

(S/R)-2-amino-hexane and
(S/R)-1-phenylpropylamine.

It depends on the particular use of the rheology modification agent of this invention, i.e. as a SCA agent in coating compositions or, more generally, as rheology control agent in various applications as will be specified below, what suitable polyisocyanates for the preparation of the rheology modification agent may be used. The polyisocyanates are preferably selected from the group consisting of aliphatic, cycloaliphatic, aralkylene, and arylene polyisocyanates, more preferably from the group consisting of substituted or unsubstituted linear aliphatic polyisocyanates with an even number of carbon atoms in the chain between two isocyanate groups (and their isocyanurates, biurets, uretdiones) and substituted or unsubstituted arylene, aralkylene, and cyclohexylene polyisocyanates. The polyisocyanate usually contains 2 to 40, and preferably 4 to 8 carbon atoms. The polyisocyanate preferably contains at most four isocyanate groups, more preferably at most three isocyanate groups, and most preferably two isocyanate groups. It is even more preferred to use a symmetrical aliphatic or cyclohexylene diisocyanate. Suitable examples of diisocyanates are preferably selected from the group consisting of tetramethylene-1,4-diisocyanate, hexamethylene-1,6-diisocyanate (HMDI), ω,ω'-dipropylether diisocyanate, thiodipropyl diisocyanate, trans-cyclohexyl-1,4-diisocyanate, dicyclohexylmethane-4,4'-diisocyanate, 1,5-dimethyl-(2,4-ω-diisocyanato methyl) benzene, 1,5-dimethyl(2,4-ω-diisocyanatoethyl)benzene, 1,3,5-trimethyl(2,4-ω-diisocyanato-methyl)benzene, 1,3,5-triethyl(2,4-ω-diisocyanatomethyl) benzene, meta-xylylene diisocyanate, para-xylylene diisocyanate, dicyclohexyldimethylmethane-4,4'-diisocyanate, 2,4-toluene diisocyanate, 2,6-toluene diisocyanate, and diphenylmethane-4,4'-diisocyanate (MDI). Further suitable polyisocyanates are preferably selected from the group consisting of polyisocyanates based on HMDI, including condensed derivatives of HMDI, such as, uretdiones, biurets, isocyanurates (trimers), and asymmetrical trimer, etc., many of which are marketed as Desmodur® N and Tolonate® HDB and Tolonate® HDT, and polyisocyanates known as "polymeric MDI". Polymeric MDI is typically a mixture of pure MDI and oligomers of MDI. Particularly preferred polyisocyanates are selected from the group consisting of HMDI, its isocyanurate trimer, its biuret, trans-cyclohexyl-1,4-diisocyanate, meta-xylylene diisocyanate, and toluene diisocyanate. Most preferably, HMDI is selected.

As will be understood by the person skilled in the art, one can also use conventionally blocked polyisocyanates which generate two or more isocyanates in situ, as long as the blocking agent, after splitting, does not prevent the formation of the rheology modification agent according to the invention. Throughout this document the term "polyisocyanate" is used to denominate all of polyisocyanates and polyisocyanate-generating compounds.

It is noted that according to yet another preferred embodiment of the invention, rheology modification agent is obtained by reacting one or more polyamines with one or more optically active isocyanates selected from compounds of the formulae

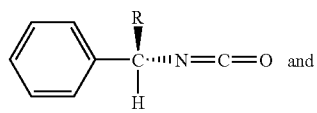

VI)

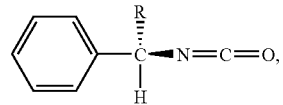

VII)

wherein R is a linear or branched, substituted or unsubstituted, saturated or unsaturated hydrocarbyl. Preferably R is selected from the group consisting of linear or branched, substituted or unsubstituted, saturated or unsaturated, $C_1$-$C_{25}$ alkyl, aryl, aralkyl, and alkenyl. More preferably R is selected from the group consisting of linear or branched $C_1$-$C_{25}$ alkyl. Even more preferably R is selected from the group consisting of linear or branched $C_1$-$C_5$ alkyl. Most preferably R is a methyl or ethyl group.

Again, it depends on the particular use of the rheology modification agent of this invention, i.e. as a SCA agent in coating compositions or, more generally, as rheology control agent in various applications as will be specified below, what suitable polyamines for the preparation of the rheology modification agent may be used. The polyamines are preferably selected from the group consisting of aliphatic, cycloaliphatic, aralkylene, and arylene polyamines, more preferably from the group consisting of substituted or unsubstituted linear aliphatic polyamines with an even number of carbon atoms in the chain between two amino groups, aralkylene, and cyclohexylene polyamines. The polyamine usually contains up to 40, and preferably 4 to 8 carbon atoms. The polyamine preferably contains at most four primary amino groups, more preferably at most three primary amino groups, and most preferably two primary amino groups. Hereinafter, a compound having two primary amino groups is referred to as "diprimary amine". It is preferred to use a symmetrical aliphatic or cyclohexylene diprimary amine. Suitable examples of diprimary amines are selected from the group consisting of hydrazine, ethylene-1,2-diamine, tetramethylene-1,4-diamine, hexamethylene-1,6-diamine, ω,ω'-dipropylether diamine, thiodipropyl diamine, trans-cyclohexylene-1,4-diamine, and dicyclohexylmethane-4,4'-diamine. It is noted that for some applications, the use of aromatic amines is less preferred, since aromatic amines often result in discoloration of the final product. The term "aromatic amine" is used to indicate that there is at least one amino group attached to the aromatic moiety. The most preferred diprimary amine is hexamethylene-1,6-diamine.

It is noted that it is also possible to react one or more optically active (poly)amines with one or more optically active (poly)isocyanates. However, for economic reasons, such a process and the resulting rheology modification agents are less preferred.

In the reaction between the isocyanate and the amine for the preparation of the rheology modification agent it is preferred that either the isocyanate or the amine is used in excess instead of using stoichiometric amounts. For example, the ratio of the number of amino groups of the amine to the number of (generated) isocyanate groups may be in the range of 0.7 to 1.5. Preferably, the ratio is about 0.9 to 1.1.

It is to be understood that any non-racemic enantiomer mixture of chiral amines can be used to make a rheology modification agent according to the invention or any mixture of chiral isocyanate can be used to make a rheology modification agent according to the invention, provided that at least one of these mixtures contains optically active amine or isocyanate according to the invention. In this description the term "enantiomeric excess", hereinafter also referred to as "ee", is used to indicate the excess of one enantiomer over racemic material in a sample that comprises both enantiomers of the chiral compound. The enantiomeric excess is expressed as a percentage: A racemic sample, i.e. a 50:50 mixture of both enantiomers, has an ee of 0% and an enantiomerically pure sample has an ee of 100%. It is noted that although use should not be made of a 50:50 ratio of two enantiomers, the optimum results may very well be obtained when the ratio of two enantiomers is not 100:0. In other words, the ee of the enantiomeric mixture should not be 0%. The ee is preferably at least 10% (as in 55:45 ratio), more preferably at least 20% (as in 60:40 ratio), even more preferably at least 40% (as in 70:30 ratio), and most preferably at least 50% (as in 75:25 ratio).

In one embodiment of the invention use is preferably made of a mixture of enantiomers with an ee of at least 55%, most preferably at least 75%, since in this embodiment the use of significant enantiomeric excess of just one enantiomer, i.e. an ee of at least 55%, results in a rheology modification agent providing a rheology control agent with improved rheology control properties.

The reaction between the isocyanate and the amine may be carried out in any arbitrarily chosen way by combining the reaction components, optionally at elevated temperature, as will be clear to a person skilled in the art. It is preferred that the reaction is carried out in an atmosphere of an inert gas at temperatures in the range of 0° C. to 150° C., more particularly in the range of 20° C. to 80° C. Although in general the reaction components are combined in any arbitrarily chosen manner, preferably the isocyanate is added to the amine, which may be done in several steps, if desired. Optionally, the reaction may be carried out in the presence of an inert solvent, such as, for example, acetone, methyl isobutyl ketone, N-methyl pyrrolidone, benzene, toluene, xylene, or an aliphatic hydrocarbon such as petroleum ether, alcohols, and water, or mixtures thereof.

Here the term "inert" indicates that the solvent does not interfere in the process of polyurea formation, which means that the amount of polyurea formed when solvent is present is at least 80% of the amount produced when no solvent is present.

The preparation of the rheology modification agent may optionally also be carried out in the presence of a binder. This is possible by mixing a mixture of the binder and the isocyanate with the amine or by mixing the isocyanates with a mixture of the binder and the amine, or mixing two mixtures of binder with amine and NCO, respectively. It will be obvious that if the binder is highly reactive with either the amine or the isocyanate, the binder and that particular susceptible compound can not be premixed. With the term "highly reactive" is meant here that more than 30% of the susceptible amine or isocyanate react with the binder before the amine and the isocyanate are mixed in order to prepare the rheology modification agent. The mixing operation may be carried out in any convenient manner, with the reactants being vigorously stirred. Amine may be added to isocyanate or isocyanate may be added to amine, whichever is most convenient. In the case a binder is used and either the amine or the isocyanate is highly reactive with the binder, than the compound that is most reactive with the binder is preferably added to the mixture of the binder with the compound that is least reactive with the binder.

In one embodiment of the invention, the rheology modification agent is produced in the binder or curing component of the final coating composition in such a low concentration, preferably 0.1-8%, that the binder dispersion can still be handled as a fluid and can be subsequently used in the coating composition, optionally using further binder, curing component, and/or other (conventional) additives. When the rheology modification agent is produced in the binder it is preferably prepared at a temperature in the range of 20-80° C., under adequate stirring.

In another embodiment for the preparation of the rheology modification agent, the binder is mixed with such amounts of the isocyanate and the amine that upon conclusion of the reaction a mixture is obtained as a solid like material, that can be used as master batch of rheology modification agent, consisting of 5-99, preferably 6-50, more preferably 7-25, parts by weight of the rheology modification agent relative to 95-1, preferably 94-50, more preferably 93-75, parts by weight of the binder. Optionally further diluents or adjuvants may be present. The binders in the final coating composition and in the master batch of the rheology modification agents may be of the same or of different composition. The preferred concentrates are suitably prepared in an atmosphere of inert gas at a temperature in the range of 20-80° C., with the amine first being added to a binder material and, after the mixture has been homogenized, the isocyanate being slowly added to the mixture, with stirring.

Although less desired, one can also prepare binder or curing compositions comprising the rheology modification agent by preparing said binder or curing compounds in the presence of said rheology modification agent or by preparing the binder or curing compound as well as the rheology modification agent at the same time. The skilled person will have no problem in combining the rheology modification agent, or starting materials for an rheology modification agent, with the starting materials for the binder or curing compound with subsequent reaction to form the rheology modification agent-containing binder or curing compositions.

If the rheology modification agent is not prepared in the binder or curing compound, it can be mixed, preferably as a concentrated solution, with one or more of the components of the coating composition, preferably the binder or any other liquid component, as a result of which a fine dispersion is obtained. The mixtures of the preferred embodiment preferably form a dispersion of the rheology modification agent in the liquid component, such as the binder, which can be solvent based or water based. When used to formulate coating compositions, the resulting coating composition show an improved rheology, here dubbed thixotropic, may have an opaque, opalescent or even transparent appearance, depending on the size and the refractive index of the dispersed particles of the rheology modification agent.

As mentioned above, the present invention also relates to the use of polyurea derivatives of the third embodiment as rheology control agent in various applications. For example, rheology control agents may be used in:
  adhesives,
  printing inks, e.g. in screen printing applications or antimisting applications,
  detergents and cleaning applications,
  paper and paperboard industries,
  textile, leather, and carpet applications,
  construction compounds,
  pigment compositions,
  mining,
  cosmetics, and/or
  coating compositions.

In a particularly preferred embodiment the polyurea derivatives of the third embodiment are used as SCA in coating compositions.

Optionally, conventional additives may be present in any of the coating compositions of the present invention, such as solvent and/or dispersing additives, pigment dispersants, dyes, pigments, UV curing-additives, flow additives, other rheology control additives, solvents and accelerators for the curing reaction, for instance acidic compounds such as p-toluene sulphonic acid or blocked products thereof. The coating compositions may comprise other conventional rheology control agents which may be solvent- or water-based.

The thixotropic coating compositions may be applied to a substrate in any desired manner, for instance by rolling, pneumatic or electrostatic spraying, brushing, sprinkling, casting, dipping.

The degree to which the rheology of the compositions in which the present rheology control agents are used is changed depends, inter alia, on the proportion of rheology modification agent and the nature of the rheology modification agent and the components of the composition. As a rule, the desired degree of thixotropy may be obtained by employing the rheology modification agent, preferably in an amount of at least 0.01%, more preferably at least 0.05%, even more preferably at least 0.10%, and most preferably at least 0.15%, and preferably at most 30%, more preferably at most 10%, even more preferably at most 3%, and most preferably at most 1.5%, based on the total weight of the composition.

The thixotropic compositions according to the invention may contain polar and/or non-polar solvents. Preferably, the thixotropy is present not only at room temperature, but also at elevated temperature, so that the rheology modification agent according to the invention is suitable for use at room temperature and in baking paints (curing), for instance in the range of 50° C. to 250° C. over a period of 2 to 120 minutes.

The rheology modification agent according to the invention further has the considerable advantage, particularly when used as an SCA, that it does not or seldom decrease the gloss or the brightness of the composition, especially for clear coats.

Depending on the binder and curing system that is employed, any conventional compound can be used as binder and curing agent. The rheology modification agents were found to be particularly suited to improve the rheology in conventional polyol-based two component (2K) coating systems that are cured with polyisocyanate compounds at a temperature of 25° C. to 150° C., as well as formulations based on acryloyl functional compounds that are cured in a conventional way, for example, through a radical mechanism as in the case of most UV- or EB-curing formulations.

BRIEF DESCRIPTION OF DRAWINGS

The features and advantages of the invention will be appreciated upon reference to the following drawings, in which.

DESCRIPTION OF ILLUSTRATIVE EMBODIMENTS

The invention is elucidated by the following examples.

EXAMPLE 1 AND COMPARATIVE EXAMPLE A

Figure 1:
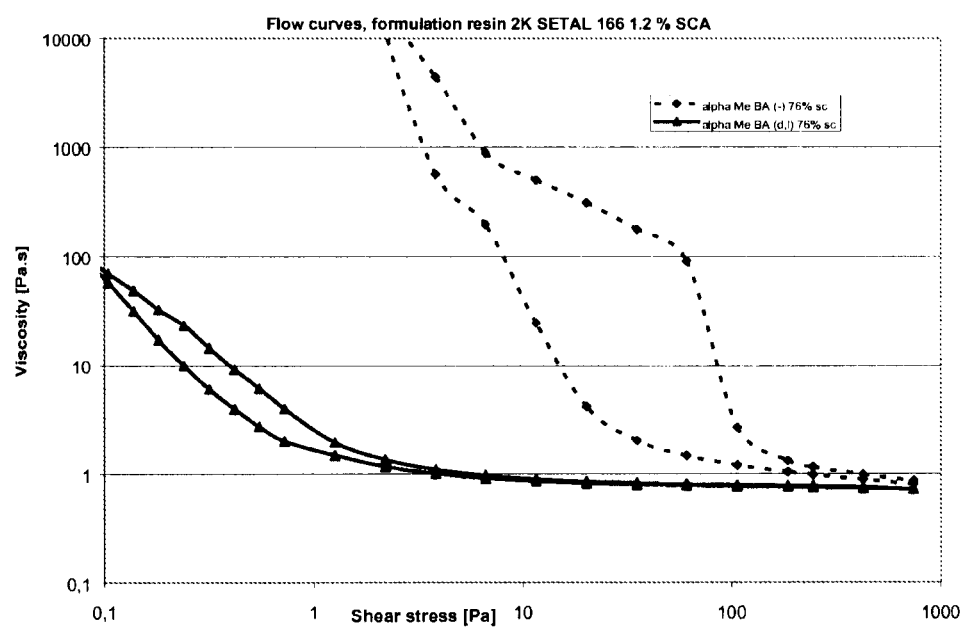
FIG. 1 is a flow curve presenting rheological data of example 1 and comparative example A according to the invention.

1-Phenyl-1-amino ethane (α-methylbenzylamine, abbreviated "alpha Me BA" or "AMBA", ex Aldrich). Both 1.73 g of a racemic mixture and the S-enantiomer of alphaMe BA were mixed separately in 100 g Setal® 166 SS 80 (80% in butyl acetate), a polyester polyol ex Akzo Nobel suitable for use in 2K coating applications, and subsequently reacted with 1.21 g hexamethylene-1,6-diisocyanate at 20° C. The reaction product was diluted with further Setal® 166 SS 80, Tolonate HDT-LV as cross-linker (to a NCO/OH ratio of 1) and additional butyl acetate to a high shear viscosity of 0.8 Pas to obtain a formulation with 1.2 parts by weight of rheology modification agent, based on 100 parts by weight of the "solid components (polyol and cross-linker). The rheological data are presented in the following flow curve (FIG. 1) (high shear-low shear-high shear measurement).

Clearly, the rheology modifying agent based on high enantiomeric excess (alpha Me BA (−)) gives much higher viscosity at low shear compared to the modifying agent prepared from the racemic rheology modifying agent (alpha Me BA (d,l)), while giving a comparable viscosity at high shear stresses.

From SEM pictures it can be seen that the diurea based on the enantiomerically pure amine forms very fine fiber like structures. The corresponding structures of the product from the racemic mixture are coarser, which is also reflected by the higher level of turbidity of the formulation.

The optically active enantiomer was found to be a very good SCA in a conventional 2K isocyanate system based on this material which resulted in a fully transparent film after application and curing at 60° C. The rheology modification agent based on the racemic mixture of amines that was used as SCA was less effective in controlling the sagging of the uncured coating film and comparable to the sagging of a conventional SCA. It also left a higher level of haze in the film

COMPARATIVE EXAMPLE B

Figure 2:
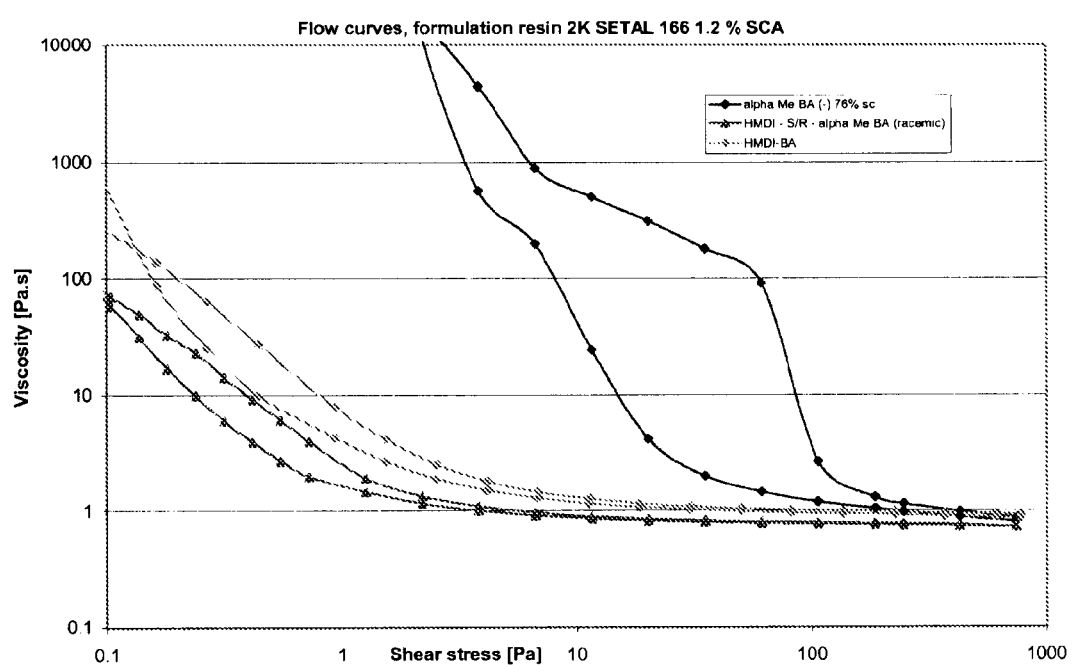
FIG. 2 is a flow curve presenting rheological data of example 1 and comparative example B according to the invention.

A similar SCA containing formulations was made in Setal® 166 SS 80, now based on a typical conventional diurea SCA formed from HMDI and (non-chiral) benzyl amine. This SCA is conventionally used in many coatings formulation. In FIG. 2, it can be seen that extent of rheological structure, in an equivalent 2K formulation, is clearly inferior to the amount of structure imparted by the analogous SCA prepared from the (high ee) methyl substituted chiral analogue AMBA (as in Example 1). When cured at 60° C., the films formed still contain a level of haze unacceptable for clear coat applications.

EXAMPLES 2-4 AND COMPARATIVE EXAMPLES C-F

Following a similar procedure as mentioned in Example 1, S-AMBA-HMDI SCA (S-α-methylbenzylamine hexamethylene-1,6-diisocyanate Sag Control Agent) containing formulations were made in Setalux® 1767 (ex Akzo Nobel Resins). The following two component isocyanate clear coat formulations were prepared. The clear coats were formulated in such a way that the formulations on solids contained different amounts of diurea's based on HMDI and S-alpha-methylbenzylamine (Formulations 1-3), and comparable amounts of analogous SCAs based on racemic alpha-methylbenzylamine (Formulation 4-6 as Comparative Examples C-F). Formulation 7 does not contain SCA at all. In all formulations thinner was added till 28 s DIN 4, 23° C. Solvesso® 100/methoxy propylacetate (1:1). The series of clear coats according to Table 1 were sprayed with increasing film thickness onto a vertical tin plate with 13 holes of 1.0 cm diameter and vertically forced dried during 60 minutes at 60° C. The sagging limit was determined as the film thickness between the hole at which sagging occurs and the preceding hole. Another way to measure sagging is to measure the layer thickness at the point where the length of the tear is 1 cm.

TABLE 1

|  | (Comparative) Example | | | | | | |
|---|---|---|---|---|---|---|---|
|  | 2 | 3 | 4 | C | D | E | F<br>No SCA |
|  | Invention | | | Racemic | | | |
| Formulation | 1 | 2 | 3 | 4 | 5 | 6 | 7 |
| Setalux ® 1767 VV-65 (s) | 51.1 | 45.7 | 37.7 | 34.1 | 34.1 | 34.1 | 64.4 |
| Setalux ® 1767 with S-alpha Me BA - HMDI (3.75% on solids) | 13.3 | 18.7 | 26.7 | | | | |
| Setalux ® 1767 with racemic alpha Me BA - HMDI (3.75% on solids) | | | | 13.3 | 18.7 | 26.7 | |
| Tinstab ® BL 277 (1% in BuAc) | 1.0 | 1.0 | 1.0 | 1.0 | 1.0 | 1.0 | 1.0 |
| Baysilon ® OL-17 (2% in BuAc) | 3.0 | 3.0 | 3.0 | 3.0 | 3.0 | 3.0 | 3.0 |
| BYK ® 306 | 0.5 | 0.5 | 0.5 | 0.5 | 0.5 | 0.5 | 0.5 |
| Tinuvin ® 292 | 1.0 | 1.0 | 1.0 | 1.0 | 1.0 | 1.0 | 1.0 |
| Tinuvin ® 1130 | 1.5 | 1.5 | 1.5 | 1.5 | 1.5 | 1.5 | 1.5 |
| Tolonate ® HDT 90 (s) | 25.0 | 25.0 | 25.0 | 25.0 | 25.0 | 25.0 | 25.0 |
| Vestanat ® T1890 | 10.6 | 10.6 | 10.6 | 10.6 | 10.6 | 10.6 | 10.6 |
| Theoretical SCA content (%) | 0.5 | 0.7 | 1.0 | 0.5 | 0.7 | 1.0 | 0 |
| Sagging limit (micron) | 46 | 60 | 75 | 42 | 43 | 52 | 43 |
| Tear length of 1 cm (micron) | 72 | >87 | >105 | 64 | 73 | 90 | 60 |

In similar formulations, when an SCA based on HMDI and (non-chiral) benzylamine was used, the application of 1.0 wt % on total solids, led to a sagging limit of 45 microns, and a layer thickness at 1 cm tears of 79 microns, clearly less than that of the HMDI-S-AMBA based formulations. Moreover, the brightness of the clearcoats of these latter formulations is significantly higher (lower haze) than that of the corresponding HMDI-BA based coatings.

EXAMPLE 5

1.73 Grams of a 90-10 mixture of S-α-methylbenzylamine (S-AMBA) and R-α-methylbenzylamine (R-AMBA) was dissolved in 100 grams of a polyester polyol (Setal® 166 SS 80 ex-Akzo Nobel Resins, solids content 80%, in butyl acetate). The solution was stirred fast, and 1.24 grams of hexamethylene-1,6-diisocyanate (HMDI) was added. A rapid build-up of viscosity followed, and a thixotropic paste like appearance of the final liquid resulted with very fine crystals.

Figure 3:
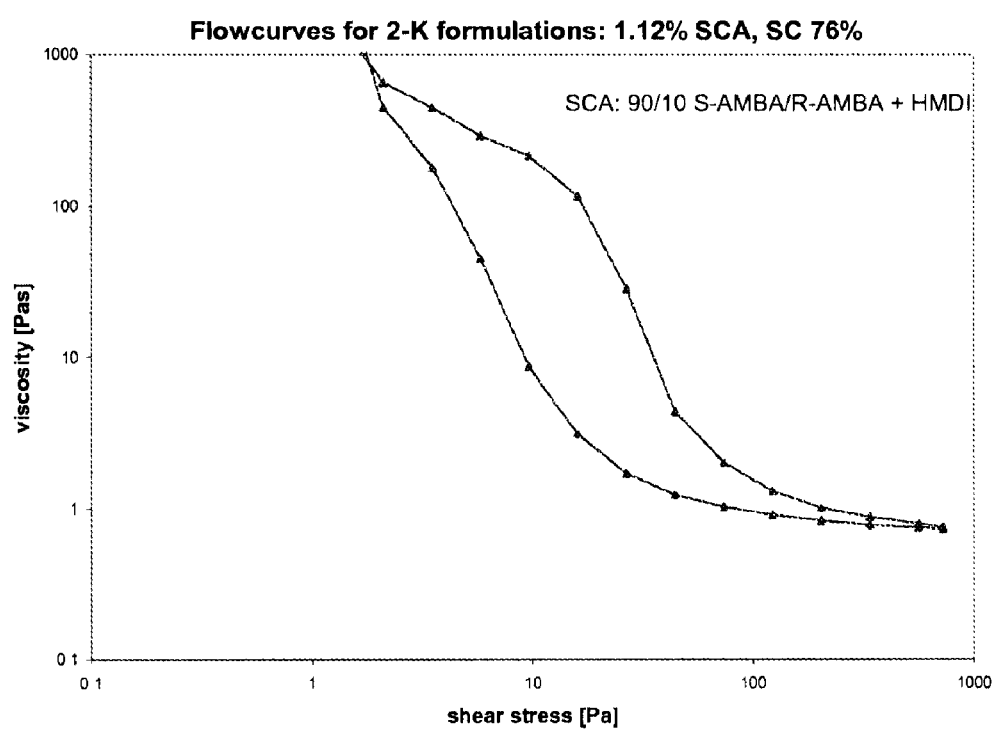
FIG. 3 is a flow curve presenting rheological data of example 5 according to the invention.

When formulated with additional Setal® 166 SS 80, and Tolonate® HDT as cross-linker, the resulting low haze formulation containing 1.12 wt % diurea on total solids proved to have a very strong and rapid structure build-up at low shear stresses (FIG. 3).

EXAMPLE 6

1.72 Grams of a 80-20 mixture of S-α-methylbenzylamine (S-AMBA) and R-α-methylbenzylamine (R-AMBA) was dissolved in 100 grams of a polyester polyol (Setal® 166 SS 80 ex-Akzo Nobel Resins, solids content 80%, in butyl acetate). The solution was stirred vigorously and 1.23 grams of hexamethylene-1,6-diisocyanate (HMDI) was added. A rapid build-up of viscosity followed, and a thixotropic paste-like appearance of the final liquid resulted.

Figure 4:
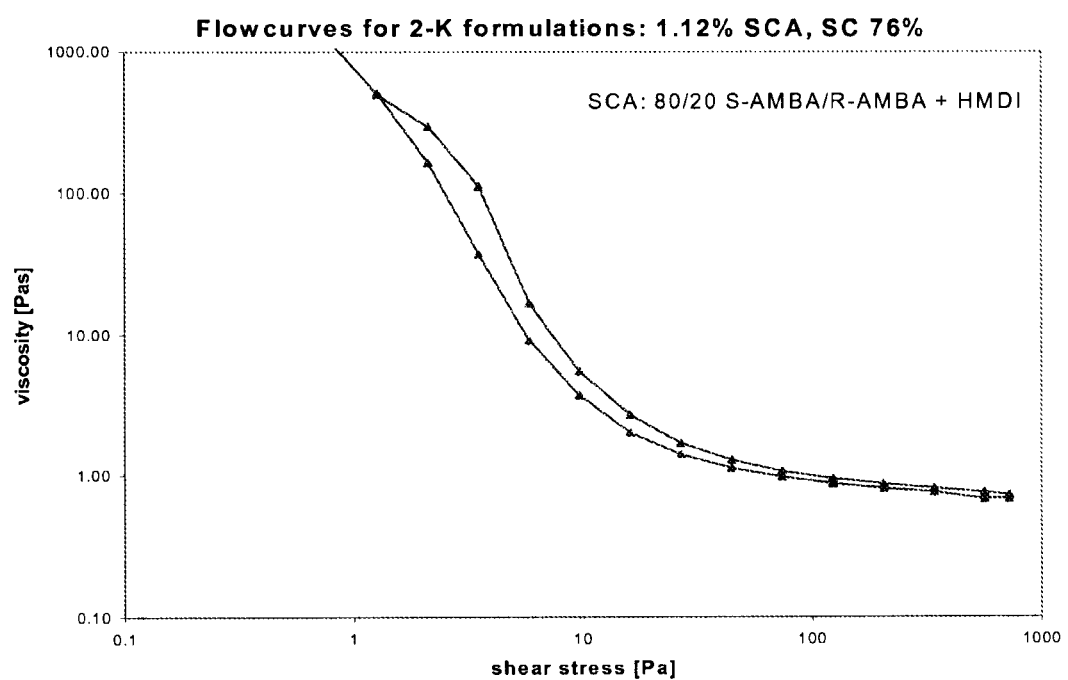
FIG. 4 is a flow curve presenting rheological data of example 6 according to the invention.

When formulated with additional Setal® 166 SS 80, and Tolonate® HDT as cross-linker, the resulting formulation containing 1.12 wt % diurea on total solids proved to have a strong and rapid structure build-up at low shear stresses (FIG. 4).

EXAMPLE 7

Figure 5:
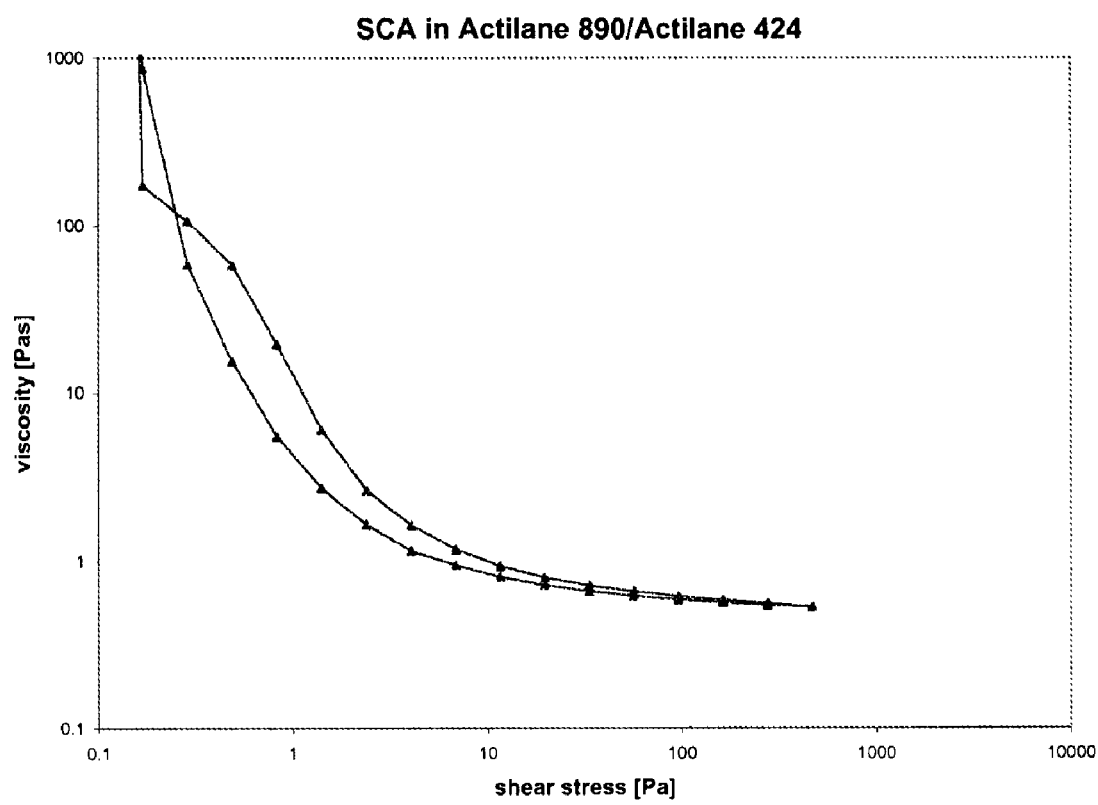
FIG. 5 is a flow curve presenting rheological data of example 7 according to the invention.

1.70 grams of HMDI was dissolved in 100 grams of an acryloyl functional resin (Actilane 890 ex-Akzo Nobel Resins). The solution was stirred fast, and 2.34 grams of S-α-methylbenzylamine (S-AMBA) (Aldrich Chemicals) was added. A rapid build-up of viscosity followed, and a thixotropic paste like appearance of the final liquid resulted. When diluted with Actilane 424 (ex Akzo Nobel Resins) to a formulation containing 0.75 wt % diurea, a transparent formulation with rapid build-up of high viscosity at low shear stresses was obtained (rheometry). When formulated with a photo initiator and exposed to UV radiation at room temperature after using a Doctor blade to prepare a thin film, a clear coating with very low haze could be obtained (FIG. 5).

EXAMPLE 8

Figure 6:
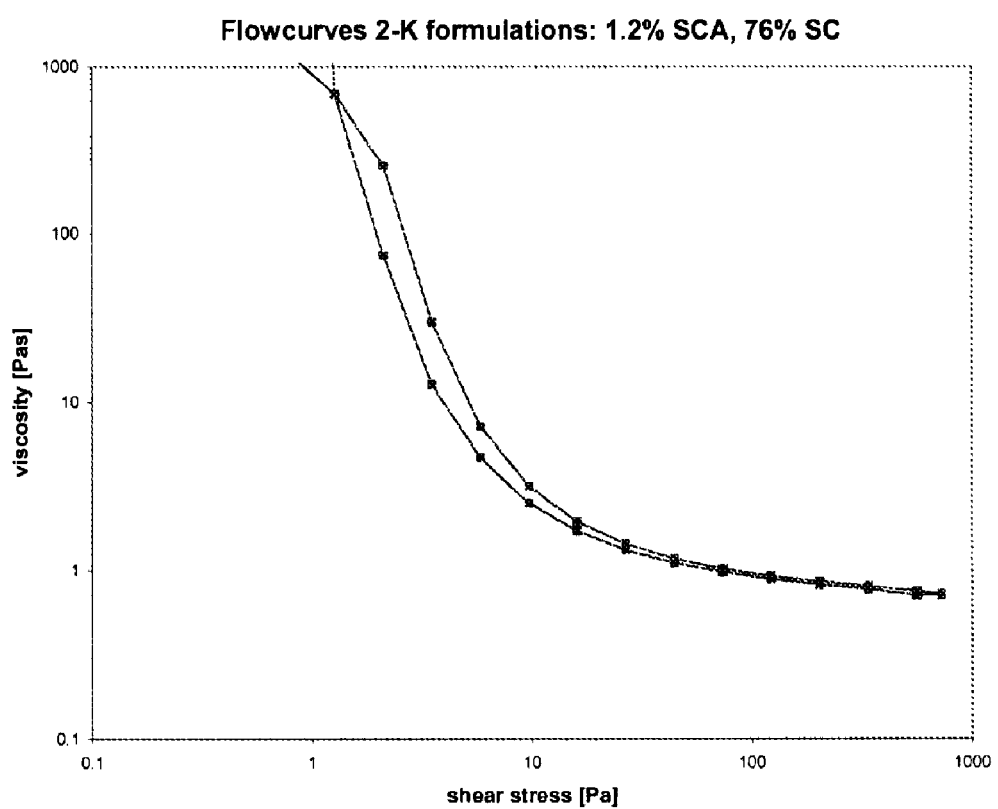
FIG. 6 is a flow curve presenting rheological data of example 8 according to the invention.

1.79 Grams of S-α-methylbenzylamine (S-AMBA) (Aldrich) and 0.21 grams of R-α-methylbenzylamine (Aldrich) were dissolved in 100 grams of a polyester polyol (Setal® 166 SS 80 ex-Akzo Nobel Resins, solids content 80%, in butyl acetate). The solution was stirred fast, and a solution of 1.85 grams of trans-1,4-cyclohexanediisocyanate in 3.71 grams of butyl acetate was added. A rapid build-up of viscosity followed immediately, and a thixotropic paste like, low haze appearance of the final liquid resulted. When formulated with additional Setal® 166 SS 80, butyl acetate and Tolonate® HDT as cross-linker, the resulting formulation containing 1.2 wt % diurea on total solids proved to have a very strong and rapid structure build-up at low shear stresses (rheometry) (FIG. 6).

EXAMPLE 9

Figure 7:
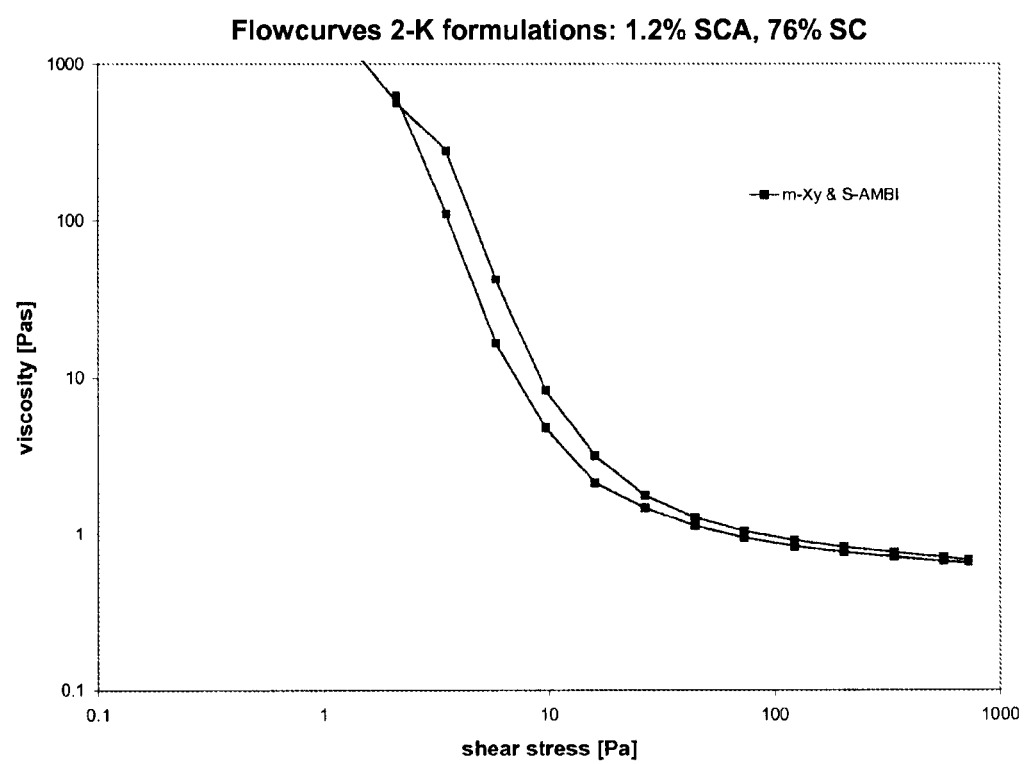
FIG. 7 is a flow curve presenting rheological data of example 9 according to the invention.

0.99 Grams of m-xylylenediamine was dissolved in 100 grams of a polyester polyol (Setal® 166 SS 80 ex-Akzo Nobel Resins, solids content 80%, in butyl acetate). The solution was stirred fast, and 2.19 grams of S-α-methylbenzylisocyanate (Aldrich Chemicals) was added. A rapid build-up of viscosity followed, and a thixotropic high viscosity liquid was obtained. When formulated with additional Setal® 166 SS 80, and Tolonate® HDT LV as NCO cross-linker, the resulting formulation containing 1.2 wt % diurea on total solids proved to have a very strong structure build-up at low shear stresses (rheometry) (FIG. 7).

EXAMPLES 10-20

Examples 10-20 relate to products according to the invention that are useful as rheology modifying agent (Table 2), and more specifically as sag control agent.

TABLE 2

| Example | Host resin | Isocyanate | Amine | Rheology structure |
|---|---|---|---|---|
| | | Polyol resins | | |
| 10 | Setal ® 166 SS 80 | S-α-methylbenzyl-isocyanate | 1,8-diaminooctane | high |
| 11 | Setal ® 166 SS 80 | HMDI | S-(+)-1-cyclohexylethylamine | high |
| 12 | Setal ® 166 SS 80 | HMDI | S-(−)-α-methyl-p-methoxybenzylamine | High |
| 13 | Setal ® 166 SS 80 | HMDI | S-(−)-α-methyl-p-methylbenzylamine | High |
| 14 | Setal ® 166 SS 80 | HMDI | S-(−)-α-methyl-p-chlorobenzylamine | High |
| 15 | Setal ® 166 SS 80 | HMDI | S-1-(1-naphtyl)ethylamine | High |
| 16 | Setal ® 166 SS 80 | Tolonate HDT-LV (isocyanurate trimer of HMDI) | S-(−)-α-methylbenzylamine | High |
| 17 | Setal ® 166 SS 80 | Tolonate HDT-LV | (80/20) S/R-α-methylbenzylamine | high |
| 18 | Setal ® 1715vx74 | HMDI | S-(−)-α-methylbenzylamine | high |
| 19 | Setalux ® 1795vx74 | HMDI | S-(−)-α-methylbenzylamine | high |
| 20 | Setalux ® 1198ss70 | HMDI | S-(−)-α-methylbenzylamine | high |
| 21 | Setalux ® 1757vv70 | HMDI | S-(−)-α-methylbenzylamine | high |
| 22 | Setalux ® 1770 | HMDI | S-(−)-α-methylbenzylamine | high |
| | | Epoxy resins | | |
| 23 | Setalux ® 8503ss60 | HMDI | S-(−)-α-methylbenzylamine | high |
| 24 | Setalux ® 8503ss60 | HMDI | (80/20) S/R-α-methylbenzylamine | high |

All SCA's prepared at 3.75% on solids in host resin as in Example 1.
All host resins ex Akzo Nobel Resins
HMDI = Hexamethylene-1,6-diisocyanate

EXAMPLE 25

Figure 8:
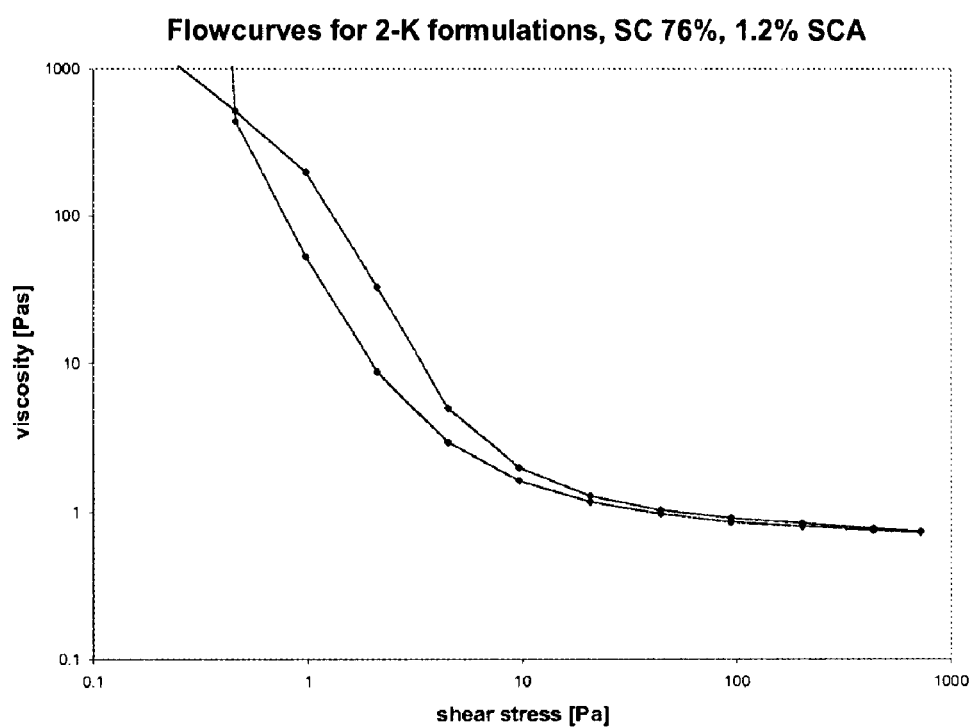
FIG. 8 is a flow curve presenting rheological data of example 25 according to the invention.

1.37 Grams of a 90-10 mixture of S-α-methylbenzylamine (S-AMBA), R-α-methylbenzylamine (R-AMBA) and 0.33 grams of hexamethylene-1,6-diamine were dissolved in 100 grams of a polyester polyol (Setal® 166 SS 80 ex-Akzo Nobel Resins, solids content 80%, in butyl acetate) by heating the solution to 30° C. The solution was stirred fast (4000 rpm), and 1.42 grams of hexamethylene-1,6-diisocyanate (HMDI) was added. A rapid build-up of viscosity followed, and a thixotropic paste like appearance of the final liquid resulted with very fine crystals. When formulated with additional Setal® 166 SS 80, and Tolonate® HDT as cross-linker, the resulting low haze formulation containing 1.2 wt % organic polyurea compound on total solids proved to have a strong and rapid structure build-up at low shear stresses (FIG. 8).

The invention claimed is:

1. A rheology modification agent is obtained by reacting one or more polyisocyanates selected from the group consisting of substituted or unsubstituted linear aliphatic polyisocyanates with an even number of carbon atoms in the chain between two isocyanate groups and substituted or unsubstituted arylene, aralkylene, and cyclohexylene polyisocyanates with one or more optically active carbon-substituted methylamines of the formula (I)

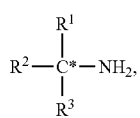

in enantiomeric excess, or by reacting one or more polyamines selected from the group consisting of substituted or unsubstituted linear aliphatic polyamines with an even number of carbon atoms in the chain between two amino groups and substituted or unsubstituted arylene, aralkylene, and cyclohexylene polyamines with one or more optically active monoisocyanates of the formula (II)

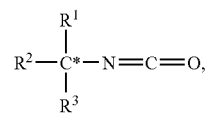

in enantiomeric excess, wherein each of $R^1$, $R^2$, and $R^3$ are independently selected from the group consisting of hydrogen and linear or branched, substituted or unsubstituted, saturated or unsaturated hydrocarbyl or a heteroatom containing group, whereby each of $R^1$, $R^2$, and $R^3$ is different such that the carbon atom is a chiral centre, with the proviso that the amine of formula (I) is not an optically active amino acid and not an optically active amino acid ester, and the isocyanate of formula II is not derived from the amino group of an optically active amino acid or optically active amino acid ester, and with the further proviso that the resulting rheology modification agent is not a compound of the formula (III)

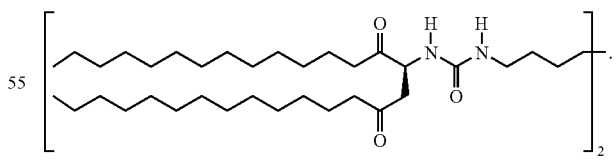

2. A rheology modification agent according to claim 1, with the general formula X-[urea-chiral centre]n, X being the linking group of the molecule and n being the number of [urea-chiral centre] moieties (n is 2 or more).

3. A rheology modification agent according to claim 1 wherein the optically active amine of formula (I) is selected from compounds of the formulae

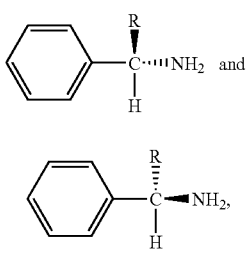

wherein R is a linear or branched, substituted or unsubstituted, saturated or unsaturated hydrocarbyl or a heteroatom containing group.

4. A rheology modification agent according to claim 1 wherein the optically active amine of formula (I) is selected from compounds of the formulae

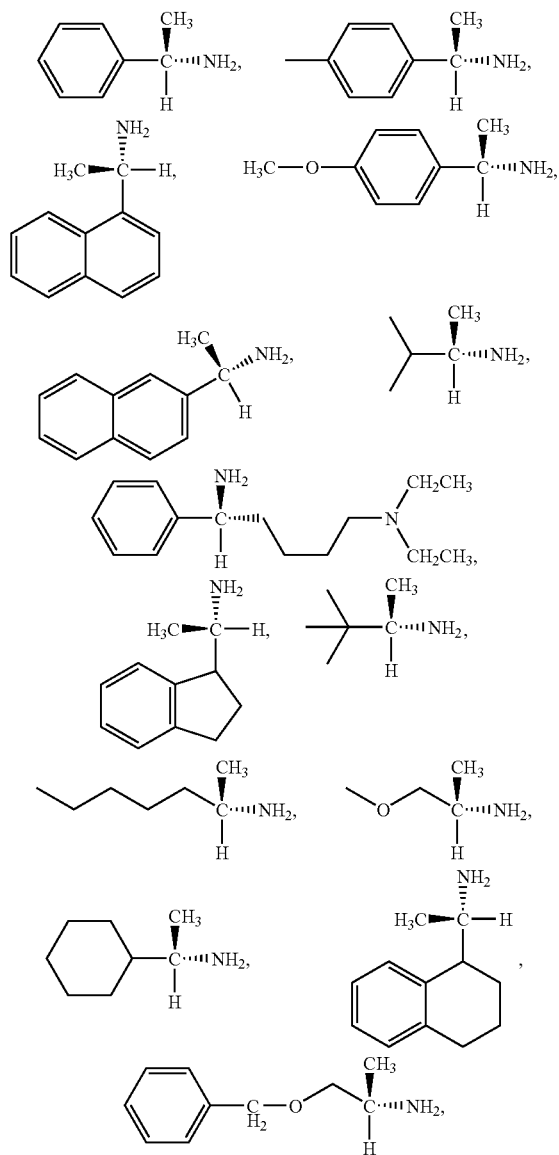

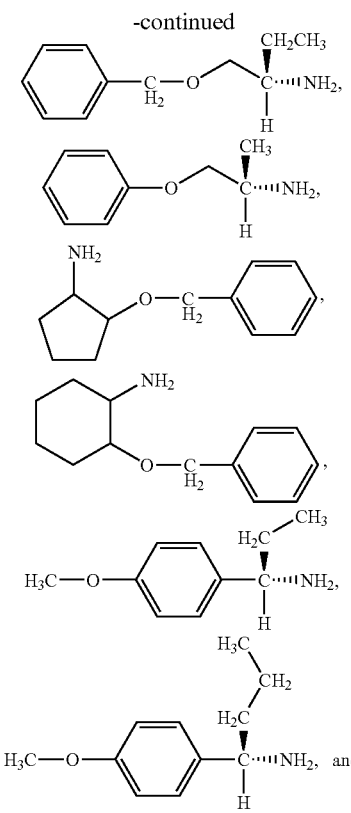

(S/R)-2-amino-hexane and (S/R)-1-phenylpropylamine.

5. A rheology modification agent according to claim 1, wherein the rheology agent is obtainable by reacting one or more polyamines selected from the group consisting of substituted or unsubstituted linear aliphatic polyamines with an even number of carbon atoms in the chain between two amino groups and substituted or unsubstituted arylene, aralkylene, and cyclohexylene polyamines with one or more optically active monoisocyanates of the formula (II)

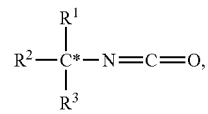

in enantiomeric excess, wherein each of $R^1$, $R^2$, and $R^3$ are independently selected from the group consisting of hydrogen and linear or branched, substituted or unsubstituted, saturated or unsaturated hydrocarbyl or a heteroatom containing group, whereby each of $R^1$, $R^2$, and $R^3$ is different such that the carbon atom is a chiral centre, wherein the optically active isocyanate of formula (II) is selected from compounds of the formulae

VI)

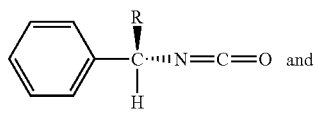

-continued

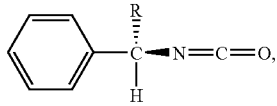

wherein R is a linear or branched, substituted or unsubstituted, saturated or unsaturated hydrocarbyl.

6. A rheology modification agent according to claim 1 wherein the hydrocarbyl is selected from the group consisting of linear, cyclic, or branched, substituted or unsubstituted, saturated or unsaturated C1-C25 alkyl, aryl, aralkyl, and alkenyl group.

7. A rheology modification agent according to claim 1, wherein the rheology modification agent is obtainable by reacting one or more polyisocyanates selected from the group consisting of substituted or unsubstituted linear aliphatic polyisocyanates with an even number of carbon atoms in the chain between two isocyanate groups and substituted or unsubstituted arylene, aralkylene, and cyclohexylene polyisocyanates with one or more optically active carbon-substituted methylamines of the formula (I)

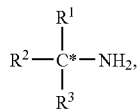

in enantiomeric excess, and wherein the optically active amine of formula (I) is α-methylbenzylamine and the polyisocyanate is hexamethylene-1,6-diisocyanate.

8. The rheology modification agent according to claim 1, wherein the rheology modification agent is implemented in an application, the application selected from the group consisting of: adhesives, printing inks, detergents and cleaning applications, paper and paperboard applications, textile, leather and carpet applications, construction compounds, pigment compositions, mining compounds, cosmetics, and coating compositions.

9. The rheology modification agent according to claim 8, wherein the rheology modification agent is a component in a conventional polyol-based two component (2K) coating system cured with polyisocyanate compounds at a temperature of 25° C. to 150° C.

10. The rheology modification agent according to claim 8, wherein the rheology modification agent is a component in a formulation based on acryloyl functional compounds that is cured in a conventional way.

11. The rheology modification agent according to claim 8, wherein the rheology modification agent is a component of a coating film that is applied onto a substrate before said coating film is cured.

12. Concentrates of a rheology modification agent according to claim 1 in a binder or inert diluent.

13. Compositions with improved rheology comprising a rheology modification agent according to claim 1.

14. Compositions according to claim 13, wherein the compositions are components in a coating, printing ink or adhesive composition.

15. A rheology modification agent according to claim 6, wherein the hydrocarbyl is selected from the group consisting of linear or branched C1-C25 alkyl.

16. A rheology modification agent according to claim 6, wherein the hydrocarbyl is selected from the group consisting of linear or branched C1-5 alkyl.

17. A rheology modification agent according to claim 6, wherein the hydrocarbyl is a methyl or ethyl group.

* * * * *